Patented Apr. 17, 1945

2,373,954

UNITED STATES PATENT OFFICE 2,373,954

MANUFACTURE OF STIFFENED FIBROUS MATERIALS

Paul Frankfurther, London, England

No Drawing. Application May 20, 1941, Serial No. 394,387. In Great Britain June 20, 1940

2 Claims. (Cl. 117—65)

It is known to treat textile materials with solutions of thermoplastic synthetic resins either for the purpose of imparting a light finish which is resistant to washing to such fabrics as tuille, muslin and voile, or for producing a material which is used as an interlining in making articles of wearing apparel such as collars, to which interlining outer layers of fabric are caused to adhere so as to impart to the article a light, elastic stiffening which resembles that of a semi-stiff collar and is resistant to washing.

It is an object of the present invention to produce from flexible fibrous materials highly stiffened materials and articles, which have a high degree of stiffness at least equal to that of whalebone, Celluloid stiffening bars, thin metal bars or stiffening wires, or of strongly stiffened bands such as starched or plaster bandages, and which lose their stiffness when heated but regain it upon cooling, whereby they are capable of being shaped while hot, for example by bending, or reshaped as often as desired, while retaining their shape and high degree of stiffness when cold.

According to this invention, such stiffened materials or articles having a degree of stiffness of the order described above are made by impregnating a flexible, fibrous material with a solution in a volatile solvent of a polyvinyl acetate so as to incorporate with the material at least 50 per cent of its weight of polyvinyl acetate resin removing substantially the whole of the solvent from the impregnated material by evaporation, thereafter increasing the stiffness of the impregnated material by heating it at a temperature at least equal to the softening point of the polyvinyl acetate in the absence of a pressing and of a shaping operation, and subjecting the polyvinyl acetate before the impregnation to the action of a hardening substance selected from the group consisting of tannic acid and formaldehyde.

The expression "flexible fibrous material" is used herein to include an article composed of such a material in a finished or partly finished state.

By the heating of the resin a higher degree of stiffness is obtained than would result from the impregnation alone, and the higher the temperature of this heating the greater is the additional stiffness obtained. The maximum additional stiffness obtained by heating the resin at or above its softening point is substantially maintained whether the material is subsequently heated to a higher or lower temperature.

The impregnated material or article may be subjected to a hot pressing operation after heating the resin, for example, when it is desired to unite several layers of impregnated material by adhesion.

The material or article is impregnated by means of a solution of the resin in a volatile solvent, which solution is preferably applied by a dipping process, but may be applied by other methods, for example, by brushing or spraying, provided that the requisite quantity of resin is applied. The resin is then heated after the evaporation of the solvent at or above the softening temperature.

The degree of stiffness obtainable after the heating of the resin can be further increased by rapidly cooling the impregnated material while it is still hot for example, by means of a blast of cold air, by pressing the material in a cold press or by means of a refrigerating apparatus.

The treatment of the resin with the hardening substance, namely, tannic acid or formaldehyde, before the impregnation may be performed, for example, by adding to the resin solution a small proportion of tannic acid, for example, about 2 to 10 per cent thereof calculated on the weight of the resin solution.

The invention is applicable to all kinds of flexible fibrous materials, more especially textile materials, for example woven or knitted fabrics, felted materials, cords or threads. Other suitable materials are, for instance, leather, paper and like absorbent flexible fibrous materials. In the manufacture of highly stiffened articles the impregnation and the heating of the impregnated material may be performed at any stage of the manufacture, for example, in making articles of elongated form, such as stiffening bars or surgical bandages, the material may be impregnated while in its elongated form. Alternatively, the material may be impregnated in sheet form and given its elongated form after impregnation or after heating, for example, by cutting an impregnated textile fabric into strip form before or after the heating operation.

It will be understood that the thickness of the fibrous material should be adequate to produce the desired degree of stiffness after the heating of the resin. In some cases a single layer of material, for example of felt or of a thick woven fabric such as the double fabric used in making semi-stiff collars, may be used. Alternatively, several layers of fabric may be united by sewing or other means before or after impregnation. It is not necessary that the layers should be agglutinated together by the resin after evaporation of the solvent, as in many cases this would be undesirable. It may, however, be desirable in some cases that the resin should agglutinate the layers, and in such cases any connection other than that afforded by the agglutination need not be used. For this purpose a resin of medium or high viscosity in a strongly concentrated solution may be used. Softening agents may also be incorporated with the resins to increase their adhesive properties. A narrow two or multi-ply band or strip of fabric may be formed by folding the fabric one or more times and uniting the folds by sewing before or after impregnation. If desired, several such bands or strips may be united by sewing. Similarly, a plurality of elongated structures, for example yarns, cords, or strips, may be united before or after impregnation but preferably after impregnation, for example, by twisting, doubling or plaiting. When the separate layers or elongated structures are united after impregnation it is advantageous to moisten the surfaces to be united with a solvent immediately before bringing them together.

To obtain the above described minimum degree of stiffness it is necessary that the material should be impregnated with at least 50 per cent of its weight of resin, but considerably higher percentages of resin, for example 500 per cent or more, may be incorporated when greater stiffening is desired. For this purpose, it is necessary that the resin solution should be of sufficiently high concentration. The quantity of resin which is incorporated in the material also depends on the method of impregnation. Thus, by dipping more resin penetrates the material than by spraying or printing, and a better penetration is obtained with a warm solution than with a cold one. Moreover, the penetration may be enhanced by treating the material while it is in a hot state, or by impregnating the material prior to the application of the resin solution with the solvent used in preparing the resin solution. The degree of stiffening also depends on the absorptive capacity of the material under treatment. For example, cotton is more absorbent than linen or artificial silk; untwisted yarn absorbs better than twisted yarn; low twist yarn better than high twist yarn; coarse yarn better than fine yarn; and a felt or flannel more than an ordinary calico. Accordingly, the concentration of the resin solution is governed to a considerable extent by the foregoing considerations, but generally speaking a solution of 15 per cent strength or higher, has been found satisfactory.

The elasticity of the finished product depends on the following factors:

(a) The viscosity of the resin used. The higher its viscosity the more elastic, and therefore the less brittle, will be the finished product.

(b) The concentration of the resin solution. The lower the concentration the more elastic is the product, but a concentration of less than 15 per cent should generally not be used otherwise the necessary degree of stiffening will not be attained.

(c) The use of agents which increase the elasticity of the resin. For this purpose a small proportion of a water-insoluble softening agent, for example 2 per cent of dibutyl phthalate or benzyl benzoate, may be incorporated in the resin solution.

The invention also includes the production of a varying degree of stiffness in the finished product, whereby a certain portion or portions of the product are given a stiffness less than the high degree of stiffness indicated above. In this way it is possible to vary the degree of stiffness of the product in the direction of its length and/or width. For example, stiffeners for garments, such as corset stays, may be given a reduced stiffness where this would be desirable in the interests of comfort in wear, for example, at the ends and/or along the edges. This varying degree of stiffness may be attained in several ways.

One way of attaining this result is to arrange that a smaller quantity of resin penetrates the portions which are to have a lower degree of stiffening. For this purpose the quantity of the solution or the concentration thereof applied to such portions may be reduced. Alternatively, the material may be preformed so as to have regions of lower absorptive capacity where a lower degree of stiffness is desired. For example, a textile fabric may be used in which the warp threads are finer, or are composed of less absorbent yarn, at the parts which are to be less stiff. Furthermore, the closeness or character of the weave may be varied. Thus, the warp threads, in particular, may be arranged more compactly in some places than in others, or the yarns may be differently woven, for example, in part by a linen weave and in part by a satin weave, or the thickness of the warp threads may vary in different areas.

It is also possible to secure a lower degree of stiffness at certain parts of the material after impregnation by heating those parts at a lower temperature than is used in heating those parts which are to be more highly stiffened. Alternatively, the parts which are to be less stiff need not be subjected to any heating operation so that they will only have the relatively low degree of stiffness which results from the impregnation itself.

The stiffness of the material may also be reduced at certain parts after the impregnation and before or after the heating of the resin by softening the resin at such parts with heat, for example, by locally applying a blast of hot air, and then immediately moistening the heated parts with a water-insoluble softening agent, such as dibutyl phthalate.

The stiffened materials or articles of the invention have the advantage that they become soft when heated and regain their stiffness on cooling. Although the products are practically unaffected by cold water they become soft in warm water, for example from 50° C. upwards depending on the softening point of the resin, and can thus be laundered.

When it is desired to perform working operations, for example sewing, on the material after impregnation and before the final heating operation, the material may be softened slightly by heat in order to facilitate such working operations. Thus, the impregnated material may be passed over a hot plate or hot roller, and sewn while it is still hot. The working operations can also be facilitated by incorporating in the resin solution a water-soluble softening agent, for example 3-6 per cent of triacetin, which, after the necessary operations have been performed, can be removed by washing so that the product attains its full degree of stiffness after the heating operation.

It is sometimes desirable, for example, in the case of stiffened articles to be worn on the body, such as surgical bandages, that the materials stiffened by the invention should be porous to air and water. For this purpose the fibrous material to be treated may contain apertures of sufficient size to remain open after the impregnation and, when applied, also after the pressing operation. There may be used, for example, a very openly woven or knitted fabric having interstices too large to become filled by the resin. Alternatively, holes may be punched in the material before or after the impregnation and/or the heating operation.

Porous materials may also be obtained by ensuring that small areas spaced at intervals over the material remain unimpregnated by the resin so that they retain the original porosity of the fibrous material. This can be done by applying to the material, before impregnation, at the areas to remain unimpregnated a protective coating of a removable resist, such as a coating of wax which is melted away after the impregnation so as to carry with it the adherent resin. The same result may be attained by covering the material with a suitable stencil, for instance a wire mesh, and applying the resin solution by spraying. The stencil is preferably held in close contact with the material during spraying by clamping means.

The invention is applicable to the manufacture of all kinds of articles which are to be stiff and thermoplastic, including stiffeners for articles of clothing and like textile articles. Among the articles to which the invention is applicable may be mentioned: corset stays, stiffeners for hat brims, hat decorations, stiffened frills, stiffeners for the front edges of collars (to replace the usual celluloid bars), basket-work, artificial flowers, belts, toys made wholly or in part of stiffened fabric, such as dolls with heads moulded from stiffened fabrics, surgical appliances such as bandages, substitutes for starch or plaster bandages, surgical splints, instep supports, and many other products. In the case of surgical appliances the invention affords the special advantage that they are washable and can be boiled, and that they can be subsequently given their original stiffness and their original or a different shape, whereby they can be made to conform closely to the shape of the body. In the case of articles which are to be worn in close contact with the body the invention also affords the advantage that they can be made porous in the manner hereinbefore described.

The following is an example illustrating the manufacture of a surgical bandage in accordance with the invention, the parts being by weight:

A strip of flannel of medium thickness is thoroughly impregnated by dipping in a solution of 18 parts of a polyvinyl acetate of medium viscosity known as Gelva 15, 12 parts of a polyvinyl acetate of high viscosity known as Gelva 45 and 2 parts of tannic acid in 70 parts of acetone. The impregnated material is allowed to dry, and is then heated to a temperature of 100° C. The material is wound into a roll while it is still sufficiently soft, and then allowed to cool and become stiff. In order to soften the bandage for application to the body it merely requires heating to about 45 to 50° C. After cooling on the body it will become stiff and afford a support substantially equal to that of a plaster bandage.

As compared with a plaster bandage, a bandage made in accordance with the invention is lighter in weight, cleaner to handle, more easy to apply and remove, more comfortable for the patient and more transparent to X-rays. Furthermore, a plaster bandage has to be entirely remade after removal, whereas the new bandage can be used repeatedly.

An instep support of great rigidity can be made by impregnating felt of about ¼ inch thickness, before or after cutting the felt to the required outline, and giving the cut blank the necessary arched form by shaping it while hot. Instead of using a single piece of felt, the required thickness can be obtained by uniting together two or more thinner layers of felt. If the layers are separately impregnated before being united a better impregnation at the interior of the product is obtainable than by impregnating a single piece of full thickness. It is also of advantage to secure a layer of heat insulating material, for example wool, to the upper surface of the single or multilayer instep support and/or between two or more of the layers of a multi-layer instep support. An additional layer or layers of impregnated felt or other fibrous material may be united to the under side of the support in the region of the arch for the purpose of reinforcement in this region.

I claim:

1. A method of producing highly stiffened fibrous materials having a degree of stiffness of the order hereinbefore defined, which comprises impregnating a flexible, fibrous material with a solution in a volatile solvent of a polyvinyl acetate so as to incorporate with the material at least 50 per cent its weight of polyvinyl acetate, removing sustantially the whole of the solvent from the impregnated material by evaporation, thereafter increasing the stiffness of the impregnated material by heating it at a temperature at least equal to the softening point of the polyvinyl acetate in the absence of a pressing operation and of a shaping operation, and subjecting the polyvinyl acetate before the impregnation to the action of a hardening substance selected from the group consisting of tannic acid and formaldehyde.

2. A method as claimed in claim 1, wherein the solution of polyvinyl acetate contains a small proportion of the hardening substance.

PAUL FRANKFURTHER.